(12) United States Patent
Fagan et al.

(10) Patent No.: US 7,164,383 B2
(45) Date of Patent: Jan. 16, 2007

(54) NAVIGATION SYSTEM USING LOCALLY AUGMENTED GPS

(75) Inventors: John E. Fagan, Norman, OK (US); Hengquin Wen, Norman, OK (US); Rick Pendergraft, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 10/669,614

(22) Filed: Sep. 24, 2003

(65) Prior Publication Data
US 2004/0119638 A1 Jun. 24, 2004

Related U.S. Application Data

(60) Provisional application No. 60/413,845, filed on Sep. 25, 2002.

(51) Int. Cl.
*G01S 5/14* (2006.01)

(52) U.S. Cl. .............. 342/357.02; 342/357.03
(58) Field of Classification Search .......... 342/357.02, 342/357.03, 357.1, 173
See application file for complete search history.

(56) References Cited

U.S. PATENT DOCUMENTS 5,786,773 A * 7/1998 Murphy ............... 340/947
6,469,655 B1 * 10/2002 Franke et al. ............ 342/36

2001/0035840 A1 11/2001 Purves et al.

FOREIGN PATENT DOCUMENTS

| AU | 5809401 A | 11/2001 |
|---|---|---|
| CA | 24050054 A1 | 11/2001 |

(Continued)

OTHER PUBLICATIONS

USDOT FAA Specification FAA-E-2937A, "Category I Local Area Augmentation System Ground Facility," Apr. 17, 2002, entire document.*

(Continued)

*Primary Examiner*—Gregory C. Issing
(74) *Attorney, Agent, or Firm*—Dunlap, Codding & Rogers, P.C.

(57) ABSTRACT

A local area augmentation navigation system for determining the location of an object using differential GPS. The system does not require any significant power or communication infrastructure. The system includes at least three reference stations, a master station and a LAAS receiver. The at least three reference stations are located in close proximity to each other and at known locations. Each of the reference stations receive a GPS signal from a GPS constellation and collect and output via a wireless transceiver the pseudo-range data from the GPS signal. The master station is positioned in close proximity to the reference stations and receives the pseudo-range data from the reference stations. The master station forms a correction message from the pseudo-range data and the known locations of the reference stations. The master station broadcasts the correction message within a specified area. The LAAS receiver is positioned within the specified area and receives the correction message broadcast by the master station as well as a GPS signal from the GPS constellation. The LAAS receiver calculates the location of the LAAS receiver with the correction message and the GPS signal.

43 Claims, 6 Drawing Sheets

FOREIGN PATENT DOCUMENTS

EP        1290468 A2    12/2003
WO     0186317 A2    11/2001

OTHER PUBLICATIONS

Lamb, Dave, "Development of Local Area Augmentation System Siting Criteria," Proc. of the ION 57th Annual Meeting Jun. 2001, see entire document.*

Wullschleger, V. et al, "FAA LAAS Specification: Requirements for Performance Type I," European Institue of Navigation GNSS 2000 Conf. May 2000, see entire document.*

Swider, Raymond et al, Recent Developments in the LAAS Program, IEEE 1998, pp. 441-470.*

"Development and test results of a precision approach and landing capability for military aircraft using an embedded GPS/INS (EGI) system" Position Location and Navigation Symposium, IEEE 1998, Palm Springs, CA, Apr. 20-23, 1998, New York, NY, IEEE; J. Elecynski et al. Apr. 20, 1998, pp. 487-494, XPO10276867; *Section "Differential Ground System" p. 492 *.

"Honeywell's Differential GPS Satellite Landing System" Avionics News Magazine, 'Online! Sep. 1996, XP002266362 Retrieved from the Internet; <URL:www.bluecoat.org/reports/ Lewison_96_DGPS.pdf> 'retrieved on Jan. 8, 2004! p. 3, col. 2, line 46 -col. 3, line 2.; G. Lewison.

"Integrating WAAS with LAAS to avoid signal spoofing" Proceedings of the 1995 8$^{th}$ International Technical Meeting of the Satellite Division of the Institute of Navigation. Part 1 of 2; Palm Springs, CA, Sep. 12-15, 1995; Vis Sandaran et al. vol. 1, 1995, pp. 677-684, XP008026226, Proc Ion GPS; Proceedings of Ion GPS 1995 Inst of Navigation, Alexandria, VA, p. 682, left-land column, line 27—line 40, p. 683, left-hand column, line 8—line 26.

"Comprehensive Integrity verification architecture for on-airport LAAS category III precision landing" Sam Pullen et al. Proceedings of the 1996 9$^{th}$ International Technical Meeting of the Satellite Division of the Institute of Navigation, Ion GPS-96, Part 2 (of 2); Kansas City, MO, Sep. 17-20, 1996, vol. 2, 1996, pp. 1623-1634, XP00266239 Proc Ion GPS; Proceedings of Ion GPS 1996 Inst of Navigation, Alexandria, VA *Section 2.1 "Ground Segment Failures", p. 1624; figure 2 *.

"Recent developments in the LAAS program YGPS" Position Location and Navigation Symposium, IEEE 1998 Palm Springs, CA, Apr. 20-23, 1998, New York, NY, IEEE, Apr. 20, 1998, pp. 441-470, XP010276866 ISBN: 0-7803-4330-1 *Section 3.3.5 "VHF Data Broadcast", p. 455—p. 456; figure 4 * R Swider et al.

* cited by examiner

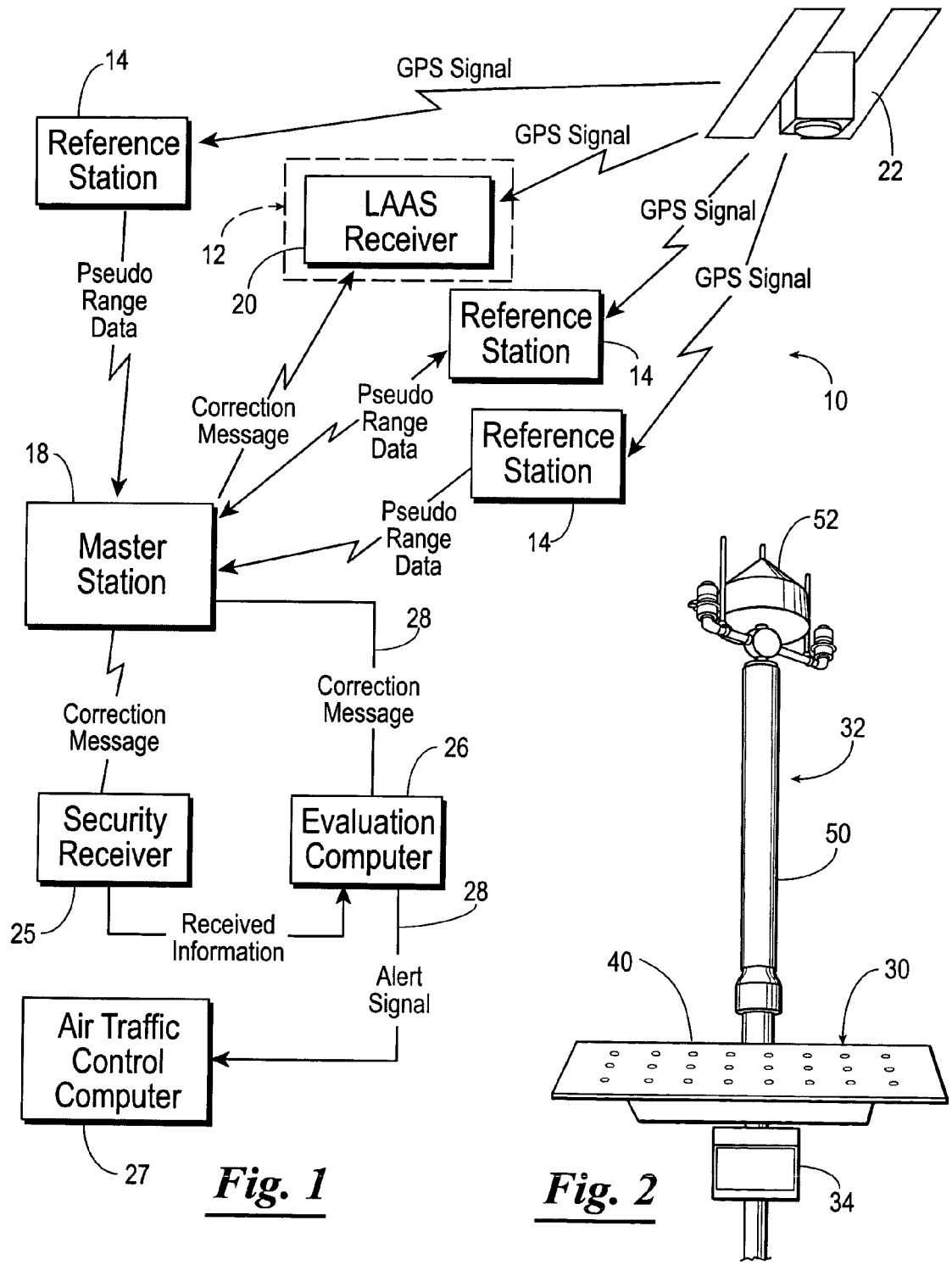

NAVIGATION SYSTEM USING LOCALLY AUGMENTED GPS

CROSS-REFERENCE TO RELATED APPLICATIONS

The present patent application claims priority to the provisional patent application identified by U.S. Ser. No. 60/413,845, entitled AIRPORT LANDING SYSTEM USING LOCALLY AUGMENTED GPS filed on Sep. 25, 2002, the entire content of which is hereby incorporated herein by reference.

STATEMENT REGARDING FEDERALLY SPONSORED RESEARCH OR DEVELOPMENT

Some aspects of this invention were made in the course of Grant DT.FA01-99-A-00011 awarded by the Federal Aviation Administration and therefore the Government has certain rights in some aspects of this invention.

BACKGROUND OF INVENTION

In today's fast-paced society, travel has become an integral part of life in both business and pleasure. Among the many forms of travel, air travel has considerably increased in recent years to become one of the main staples. In 1995, the air travel system moved 555 million passengers. The Federal Aviation Administration forecasts predicted 800 million passengers per year will be flying in less than a decade, with more than one billion flying annually by 2010. This rapid increase has raised concerns about the ability of present-day navigational systems to provide the precise positional awareness that is essential to manage the increased volume of planes and passengers.

Present-day aircraft navigation consists of utilizing several different navigational aids to form a complete navigation system; a single system to provide position information through all phases of flight does not exist. Consequently the purchase and maintenance of a complete aircraft navigation system has been extremely expensive and complex.

A system that is being explored as a possible sole means navigation system is the satellite-based global positioning system (GPS).

Global Positioning System

The Global Positioning System (GPS) is a navigation system consisting of a constellation of twenty-four satellites in orbit approximately 11,000 nautical miles above the earth's surface. The GPS constellation is comprised of six orbital planes, each containing four satellites spaced at 60 degree increments. This spacing is in order to ensure that at least four satellites can be viewed from any point on the earth's surface at any given time. GPS navigation is based on satellite ranging: position is determined by measuring the distance of a receiver from a group of satellites in space. The satellites act as precise reference points from which receivers on the ground calculate their position.

Satellite Ranging

In theory, satellite ranging requires a minimum of three satellites to calculate the position of the receiver. The distance to each satellite is calculated by receiving unique timing codes from each of the three satellites and calculating the time it took for each timing code to travel from the satellite to the receiver antenna. These timing codes travel at approximately the speed of light ($3 \times 10^8$ meters per second). Therefore, once the travel time, $T_t$ (s), is known the distance can be calculated from the following equation. These calculated distances are referred to as pseudo-ranges.

$$\text{Distance}(m) = T_t * 3 \times 10_8 \text{ m/s}$$

Because the travel time is a calculated value, it is susceptible to several different types of errors. For this reason, it is often necessary to correct for these errors when the user requires a precise position measurement.

With one calculated distance, the receiver knows that it is located somewhere on the surface of an imaginary sphere that is centered on the satellite whose distance is known. A second distance measurement to a different satellite refines the known position of the receiver as a result of simple mathematics. Geometrically, the intersection of two spheres is a circle; therefore the receiver must lie on a circle. A distance measurement from a third satellite narrows the position to two points on a circle. In theory, one of the two calculated positions can be discarded because it will furnish the receiver with a position that is not within the realm of possibility (i.e., thousands of kilometers away from the earth). However, in practice a fourth distance measurement is taken to serve two purposes. The first purpose is to verify which of the two points is the actual location of the receiver. Additionally, the fourth distance measurement is used to compensate for the inaccuracies of the receiver's clock. This is very important because if the receiver's clock and the satellites clock are not synchronized, the calculated position will be wrong.

Limitations of G.P.S.

The Global Positioning System (G.P.S.) has been recognized as the future of navigation for the aviation community. The greatest hurdle that the global positioning system must overcome is an inability to provide quality suitable for primary-means aircraft navigation. G.P.S. fails to provide the accuracy, integrity, availability, and continuity of service, which are currently required for this type of service. These downfalls are a result of several different error sources. The sources include satellite and receiver clock inaccuracies, ephemerid error, the ionosphere, and multipath.

The atomic clocks that are used in satellites are extremely accurate; however, they still have small deviations that can manifest in the form of calculation errors. G.P.S. receivers do not use atomic clocks and are therefore even more susceptible to timing errors.

Because satellites drift slightly from their predicted orbits, their exact position relative to the earth is not always known. This uncertainty in position can lead to errors in the receiver's position calculations. This type of error is referred to as ephemerid error.

All information that is transmitted by the satellites is in the form of radio signals. Unfortunately, radio waves are susceptible to many types of interference. One possible source of interference is the atmosphere, specifically the ionosphere and troposphere. The ionosphere, which is the atmospheric layer located from 50 to 500 kilometers above the earth's surface, contains a large number of free electrons. These electrons appear opaque to the radio waves and therefore cause the waves to deflect. The troposphere, the layer of the atmosphere from ground level to approximately 8 km above the earth's surface, is also a source of interference. This interference is a result of variations in the composition of the medium through which the radio waves are traveling. Both of these layers cause a deviation in the radio waves' paths, which introduces a delay in transmission time and can lead to erroneous distance calculations. This error is referred to as atmospheric delay.

Another phenomenon that causes flawed transmission times is known as multipath. Multipath is similar to atmospheric delay, except the deflections are caused by terrestrial objects such as mountains, buildings, large antennas and other obstacles.

It is believed the solution to these problems is a differential G.P.S. system that can compensate for the errors and thus provide the accuracy, integrity, and availability that is required for all aspects of flight.

Differential G.P.S.

Contingencies, such as the accuracy of the satellite's clock, ephemeris error, the refractive nature of the atmosphere, or multipath, may combine to create a GPS signal that is simply not accurate enough with which to navigate. Differential GPS is a method by which GPS signals that contain errors may be augmented to improve the quality of the signal. This is accomplished by providing corrections to the errors that exist in a normal GPS signal. To provide these corrections, at least one reference receiver must be used to resolve the inaccuracies in the GPS signal.

The reference receiver is a stationary receiver whose exact position is known, by means of a precise survey. This reference receiver calculates error corrections by reverse engineering the position calculations. The reference receiver uses its known location and the predicted location of the satellite and its orbit to calculate the approximate distance, or pseudo-range, between the reference receiver and the satellite. This distance is then divided by the speed of light to calculate the expected travel time of the GPS signal from the satellite to the receiver. This predicted travel time is then compared to the actual travel time. The difference between the two measurements is the error in the GPS signal and is referred to as timing error. This timing error results in an inaccurate pseudo-range to the satellite, which must be corrected in order to improve the accuracy of the GPS signal. In order to accomplish this, a pseudo-range correction corresponding to the calculated error is transmitted to any receiver in the local vicinity so that it may adjust its position accordingly. This receiver uses the error correction to augment the GPS signal in an effort to improve its accuracy. This principle of correcting for uncertainties in the GPS signal by using reference receivers to calculate error corrections is known as Differential G.P.S. (DIPS). DIPS can be implemented by several different methods.

W. A. A. S. (Wide Area Augmentation System) is an augmentation of the G.P.S., which includes integrity broadcast, differential corrections and additional ranging signals. W.A.A.S. is being developed to provide the accuracy, integrity and availability required to support all phases of flight including precision approaches and landings.

Wide Area Augmentation System

Wide Area Augmentation System (W. A. A. S.) is one method by which differential G.P.S. can be implemented to improve the accuracy of the standard G.P.S. signal. This method is referred to as wide area because it was designed to provide differential corrections for the entire United States. W. A. A. S. is implemented through the use of 25 ground reference stations and two master stations, all of which are linked together to form a network across the United States.

Each reference station has been surveyed in order to determine its precise location. These ground reference stations each receive position data from the G.P.S. constellation. Utilizing this data received from the G.P.S. satellite, along with its known location, the reference station calculates any error that exists in the G.P.S. signal. Each station in the network then relays its pseudo-range corrections to a master station, The master station then formats all of the correction information into a message. The message is broken into sections dedicated for specific geographical regions within the United States. This correction message is then up linked to a geostationary communication satellite. This satellite travels in the same orbit as the earth and is therefore always located in the same position relative to the earth. The message is then broadcast from the geostationary satellite on the same frequency as G.P.S. to GPS/W. A. A. S. receivers that are within the broadcast coverage area of the W. A. A. S. The correction message is then combined with the standard GPS signal to form a more precise position signal for navigation.

The W. A. A. S. signal drastically improves the accuracy of the GPS signal thus lending itself to several new applications, such as aircraft navigation. However, due to its space-based nature, the W. A. A. S. signal is susceptible to some of the same problems as standard GPS, primarily the latencies that occur from being transmitted from space through the earth's dense atmosphere. These latencies are not an issue in normal flight and landings; however, in instances where higher precision is essential, the W. A. A. S. will not provide an accurate enough signal. For this reason the Local Area Augmentation System is being developed in accordance with the present invention in an effort to provide the accuracy, integrity and availability required for precision approaches.

Local Area Augmentation System

Another method of implementing differential GPS is through the use of a Local Area Augmentation System (LAAS). LAAS was originally designed so that one system would provide differential corrections for all receivers within a 20 mile radius, thus referred to as local. A Local Area Augmentation System will consist of at least three precisely surveyed ground reference stations and a master reference station, all located in close proximity of each other. Each of these reference stations will receive GPS position information and relay this position to the master reference station. The master reference station uses the received position information, as well as the surveyed position of the reference stations, to calculate any error that exists in the GPS signal. The master ground station will then form a correction message using this calculated error. It then broadcasts this message using a VHF transmitter to all GPS/LAAS receivers within the specified area. Because the LAAS is ground based, it does not suffer from the same transmission problems that affect WAAS and standard GPS. Therefore, it has the potential to provide the quality of signal for applications that demand more precise position information. One of these applications is precision aircraft approaches and landings. The LAAS is intended to become the primary radio navigation system to support Category II and III precision approach operations, particularly where those operations cannot be supported by the precision approach capability of the WAAS.

Motivation

Presently aircraft navigation is provided by several different navigational aids such as ILS, DME, ADF, VOR and others. None of these navigational aids can provide in route navigation as well as precision and non-precision approaches and landings. For this reason, the use of navigational aids in an aircraft is very costly, because not one but a combination of the above systems must be used to provide total aircraft navigation. Another drawback to present-day navigation systems is the high pilot workload; he must constantly manage several different systems in order to navigate the airplane. Consequently this can lead to problems during flight. As a result, the Federal Aviation Administration (FAA) has embarked on an aggressive program to make satellite-based navigation technology available for use throughout the National Air Space System (NAS). Satellite-based navigation services will provide significant economic and safety benefits to the entire aviation community.

The benefit of using G.P.S. is that it will eliminate the need for more than one navigational aid, which will be much more cost-effective as well as reduce the pilot workload. However, research has proven the standard G.P.S. cannot provide the precision that is necessary for complete aircraft navigation. Therefore, differential G.P.S. is being used as a solution. W. A. A. S. has already shown that they can provide the accuracy needed for all stages of flight; however, it does not provide the integrity required by all stages of precision approach and landing. It is believed that L. A. A. S. in accordance with the present invention will provide better accuracy and integrity than W. A. A. S.

BRIEF DESCRIPTION OF SEVERAL VIEWS OF THE DRAWINGS

FIG. 1 is a block diagram of a navigation system constructed in accordance with the present invention.

FIG. 2 is a perspective view of a reference station constructed in accordance with the present invention.

DETAILED DESCRIPTION OF INVENTION

Figure 3:
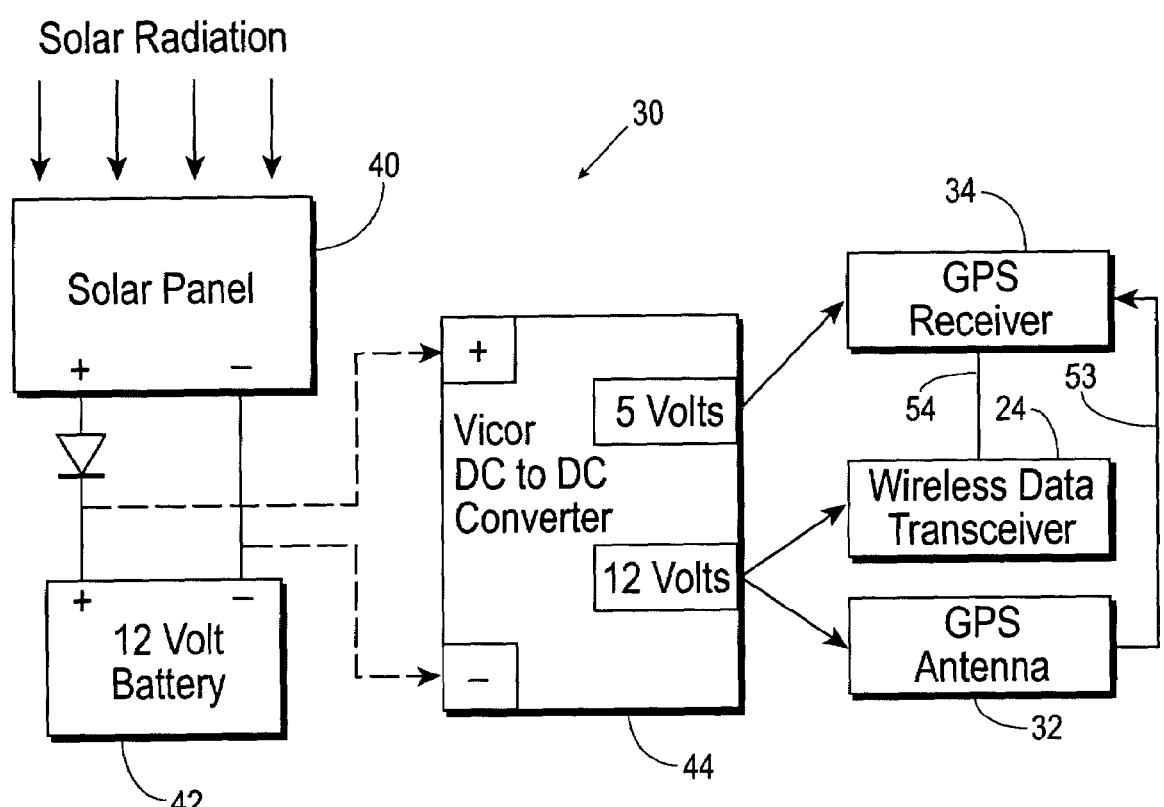
FIG. 3 is a block diagram of a power system for the reference station depicted in FIG. 2.

Referring now to FIG. 1, shown therein and designated by a reference numeral 10 is a navigation system constructed in accordance with the present invention. The navigation system 10 uses locally augmented GPS and does not require significant support infrastructure, such as power and communication lines. Although the navigation system 10 is described herein as a navigation system for an airport landing system, it should be understood that the navigation system 10 can be used for other types of navigation, such as nautical navigation, vehicular navigation or navigation of robots or other types of equipment or machinery. For example, the navigation system 10 can be used for navigating barges or other types of ships. The navigation system 10 is especially useful in high-volume traffic areas.

Set forth hereinafter is one specific embodiment of the present invention. However, it should be understood that the present invention is not limited to this specific embodiment. The navigation system 10 is capable of other embodiments or being practiced or carried out in various ways. Also, it is to be understood that the phraseology and terminology employed herein is for purpose of description and should not be regarded as limiting.

The navigation system 10 is useful for determining the location of an object 12 using differential GPS. In one preferred embodiment, the object 12 is an airplane. However, it should be understood that the object 12 can be any type of device or machinery such as a ship, vehicle, robot, or other type of equipment or machinery. In general, the navigation system 10 is provided with at least two reference stations 14, a master station 18, and a L.A.A.S. receiver 20.

The reference stations 14 are located in close proximity to each other and at known locations. It should be understood that the distance between the reference stations 14 can vary so long as the reference stations 14 function to provide the pseudo-range data discussed herein to the master station 18. Typically, the reference stations 14 will be between 50 feet and 5,000 feet apart. Preferably three or more reference stations 14 are used. The reference stations 14 can each be provided or mounted on the earth, building or other structure where the precise location of the reference stations 14 can be determined. Preferably, the location of each of the reference stations 14 is determined by a precise survey. Each of the reference stations 14 receives a GPS signal from a GPS constellation 22 (only one satellite of the GPS constellation 22 is shown for purposes of brevity) and collects pseudo-range data based on the GPS signal received from the GPS constellation. The pseudo-range data is output via a wireless transceiver 24.

The wireless transceiver 24 can be any type of wireless transceiver capable of highly reliable and accurate wireless communications, such as UHF, VHF or spread spectrum. For example, the wireless transceiver 24 can be a 900 Mhz spread spectrum transmitter or other frequencies of spread spectrum technology. In an alternate embodiment, hard-wired communications, such as shielded twisted-pair or fiber optics could be used instead of and/or in addition to the wireless transceiver 24. The pseudo-range data is preferably encoded so as to provide a secure connection between the reference stations 14 and the master station 18. The reference stations 14 and/or the master station 18 are designed to provide data verification checks (such as a cyclical redundancy check, multiple transmissions, ask and answer protocol(s), handshakes, multiple rf links or the like) to verify that the connection is secure. The pseudo range data can be encoded by any suitable encryption or encoding scheme.

The exact location of the master station 18 does not have to be known. The master station 18 is positioned in proximity to the reference stations 14 and receives the pseudo-range data from the reference stations 14. The master station 18 could in fact be incorporated into one of the reference stations 14. The master station 18 is mounted or provided on the earth, a building or other suitable structure. The master station 18 can be fixed or movable. For example, the master station 18 can be airborne or mounted to a truck or vehicle. The master station 18 can be provided within the airport. The master station 18 forms a correction message from the pseudo-range data and the known locations of the reference stations 14. The master station 18 broadcasts the correction message within a specified area. The specified area preferably has a radius of less than about 20 miles. The LAAS receiver 20 is positioned within the specified area and receives the correction message broadcast by the master station 18 as well as a GPS signal from the GPS constellation. The LAAS receiver 20 calculates the location of the LAAS receiver 20 with the correction message and the GPS signal. The LAAS receiver 20 is mounted to or otherwise associated with the object 12 so that the position of at least a portion of the object 12 can be determined.

In one preferred embodiment, the master station 18 uses the received pseudo-range data, i.e., position information, as well as the survey position of the reference stations 14 to calculate any error that exists in the GPS signal received by the reference stations 14. The master station 18 will then form the correction message using this calculated error. The master station 18 preferably broadcasts the correction message via a VHF or UHF transmitter to all LAAS receivers 20 within the specified area. When the master station 18 is ground-based, the master station 18 does not suffer from the same transmission problems that affect W.A.A.S. and standard GPS. Therefore, the navigation system 10 has the potential to provide the quality of signal for applications that demand more precise decision information. One of these applications is precision aircraft approaches and landing. In this regard, the navigation system 10 discussed hereinafter is intended to become the primary net radio navigation system to support category two and three precision approach operations, particularly where those operations cannot be supported by the precision approach capability of the W.A.A.S.

When the navigation system 10 is used as an airport landing system, the navigation system 10 provides a local-area correction for use by airborne receivers (LAAS receiver 20) used to land aircraft in a precise manner in all kinds of weather. The navigation system 10 is unique in the fact that it does not require any additional support infrastructure from the airport, no power, and no communications. In this instance, the navigation system 10 is preferably solar powered and uses electronics that use a very small amount of energy. In addition, the navigation system 10 makes use of spread spectrum wireless technology to convey data to and from the master station 18.

The master station 18 preferably provides an omni directional broadcast or directional broadcast of data that when combined with the GPS signal also received by the LAAS receiver 20 allows the user to very precisely know the position of the object 12 in space. The navigation system 10 makes use of the concept of differential GPS to provide the precise position on board the aircraft. The navigation system 10 can also be used to locate vehicles and other equipment very precisely on the ground in the close vicinity of the airport or other installation where the navigation system 10 is located.

As will be understood by one skilled in the art, the navigation system 10 can improve the precision of landing aircraft or navigating ships, for example and offer a greater degree of safety to the incoming aircraft due to more precisely knowing the position and altitude, and providing a service that is more reliable and continuous than conventional precision landing systems in use today.

To provide protection against potential jamming and/or terrorist attacks of the correction message broadcast by the master station 18 from unauthorized broadcasters attempting to crash the airplane, the navigation system 10 is provided with a security receiver 25 and an evaluation computer 26. The security receiver 25 has a separate antenna and is desirably positioned remotely and distinctly from the master station 18, and more desirably is positioned in the flight path of the airplane on landing. Desirably, the security receiver 25 is positioned at least 100 feet away from the antenna used by the master station 18 to broadcast the correction message. Even more desirably, the security receiver 25 is positioned approximately one to two miles away from the antenna used by the master station 18 to broadcast the correction message.

The security receiver 25 and/or evaluation computer 26 is linked either by cable or wireless communications with the master station 18 or an air traffic control computer 27.

To receive the correction message from the master station 18, the security receiver 25 is tuned to the same frequency as the transmitter of the master station 18. The security receiver 25 is positioned and tuned to monitor the quality of the correction message broadcast by the master station 18, as well as to listen for any unauthorized broadcasts in the area having a similar character (e.g., frequency, power, data type or the like) or nature as the correction message broadcast by the master station 18.

The security receiver 25 outputs received information to the evaluation computer 26. The evaluation computer 26 also receives the correction message from the master station 18 via a separate communication link 28 than the correction message broadcast by the master station 18 to the reference receivers 14. For example, the evaluation computer 26 could receive the correction message via a separate frequency or a hard-wired connection.

To determine whether signals have been received by the security receiver 25 which are indicative of an unauthorized broadcaster, the evaluation computer 26 is programmed to analyze the information signal received from the security receiver 25 to determine whether the information signal is of a similar character, (e.g., frequency, power, data type or the like) with the correction message received from the master station and output an alert signal when a message is received by the security receiver 25 which is indicative of an unauthorized broadcaster. The alert signal is eventually provided to the pilot of the airplane by any suitable method to alert the pilot of a jamming or interfering signal indicative of a potential terrorist attempting to crash the airplane. The alert signal can be routed to the pilot in any number of ways. For example, the alert signal can be output to the master station 18 which provides the alert signal to the airplane on a separate frequency. Alternatively, the security receiver 25 and/or the evaluation computer 26 can be autonomous from the master station 18 and in this case the alert signal can be output to the air traffic control computer 27, or the FAA, via a communication link 28, for example, for forwarding to the object 12, such as the airplane for example. In other words, the security receiver 25 and/or the evaluation computer 26 can function in concert with or independent to the master station 18.

In one preferred embodiment, the evaluation computer 26 receives the correction message output by the master station 18 and determines that an unauthorized broadcaster exists when the message received by the security receiver 25 does not match the correction message broadcast by the master station 18.

It should be understood that the security receiver 25, and the evaluation computer 26 have been shown separately for purposes of clarity. In practice, the evaluation computer 26 can be implemented in combination with the security receiver 25, the master station 18, or the air traffic control computer 27. Alternatively, the evaluation computer 26 could be a stand-alone unit.

The security receiver 25 and/or the evaluation computer 26 could be provided or installed with the navigation system 10 as a whole, and/or sold and/or delivered as an "add-on" to an existing local area augmentation navigation system.

Each of the primary functional groups: the reference stations 14, the master station 18 and the LAAS receiver 20 will be described below.

Reference Stations 14

Each of the reference stations 14 are similar in construction and function. Thus, only one of the reference stations 14 will be described in detail hereinafter. The function of each reference station 14 is to collect pseudo-range data from the GPS constellation 22 and transmit the pseudo-range data to the master station 18 for calculating pseudo-range corrections.

The reference station 14 receives timing messages from the GPS constellation and calculates the corresponding pseudo-ranges. These pseudo-ranges are relayed to the master station 18 via the wireless transceiver 24, such as a spread spectrum modem. The master station 18 uses these pseudo-range data, along with the surveyed location of each reference station 14, to compute a set of pseudo-range corrections for each reference station 14.

As shown in FIGS. 2 and 3, each reference station 14 is provided with four fundamental parts, a power system 30, a GPS antenna 32, a GPS receiver 34 and the wireless transceiver 24. These sub systems function together to form a reliable pseudo-range collector.

Power System

In one preferred embodiment, the power system 30 of each of the references stations 14 is independent from airport infrastructure. In this embodiment, the power system of the reference station 14 is comprised of three pieces of equipment: an alternate energy power source, such as a solar panel 40, a battery 42 and a DC-to-DC converter 44. A block diagram of the configuration of the power system 30 is shown in FIG. 3.

The solar panel 40 is connected in parallel with the battery 42 and utilizes the sun's energy to charge the battery 42. The solar panel 40 can be an AP-1106 solar panel obtainable from AstroPower of Newark, Del. The specifications of the solar panel 40 can vary widely depending on the environment and the electrical requirements of the electronics in the reference station 14. In one preferred embodiment, the solar panel 40 has a rated power of 110 W, a rated voltage of 16.7 Volts and a rated current of 6.6 amperes.

The battery 42 provides voltage to the DC-to-DC converter 44, which powers the reference stations' electronics. The battery 42 can have any suitable voltage and current characteristics capable of powering the electronics of the reference station 14. In one preferred embodiment, the battery is a 12-volt battery.

The DC-to-DC converter 44 functions as a voltage regulator, providing a reliable constant voltage to the electronics of the reference station 14. The DC-to-DC converter 44 can be a custom designed DC-to-DC converter obtainable from Vicor Corporation of Andover, Mass. The DC-to-DC converter 44 takes a wide range of DC input voltages and supplies a regulated 12 volt and 5 volt DC output.

The 5 volt supply powers the wireless transceiver 24, e.g., the spread spectrum modem, while the 12 volt output provides power to the GPS receiver 34 and the GPS antenna 32.

Preferably, the reference station 14 is powered separately from the airport so that no additional infrastructure need be obtained in implementing the navigation system 10. Although the reference station 14 has been described herein as having the solar panel 40 for charging the battery 42, it should be understood that any type of power separate from the airport infrastructure can be used. For example, the reference station 14 could be provided with wind power, solar power, one or more fuel cell, or the like. Alternatively, the reference station 14 could be connected to airport or other infrastructure if it was desired to do so in implementing the navigation system 10. The power load at each reference station 14 is designed so that the battery 42 can supply necessary power for 2–3 weeks without the presence of other power.

GPS Antenna

Figure 4:
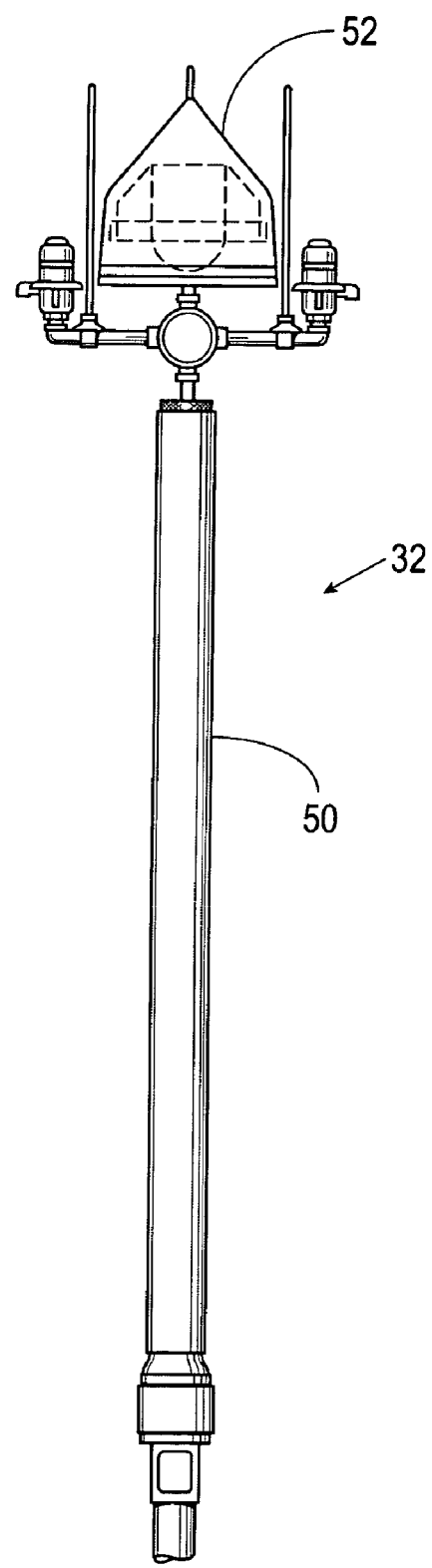
FIG. 4 is a side elevational view of a GPS antenna for the reference station depicted in FIG. 2.

One embodiment of the GPS antenna 32 is shown in FIG. 4. The GPS antenna 32 is preferably a multipath limiting GPS antenna. The GPS antenna 32 can be a dBS 200A-Integrated Multipath Limiting Antenna (IMLA) G.P.S. antenna, which was constructed by dB Systems of Salt Lake City, Utah.

Figure 5:
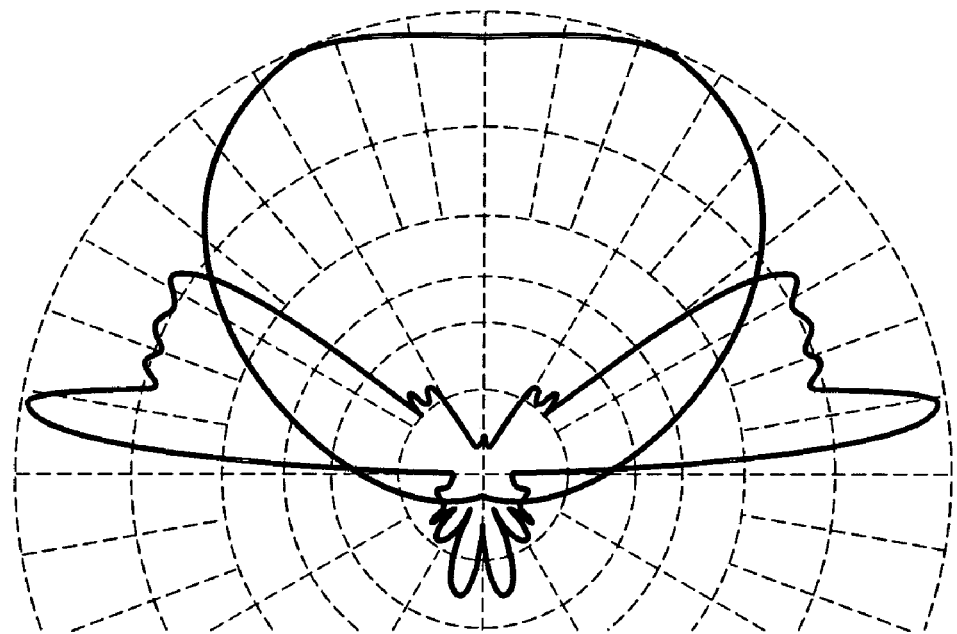
FIG. 5 is a diagram of an antenna pattern for the reference station depicted in FIG. 2.

The GPS antenna 32 is provided with two separate antennas: a dipole antenna 50 and a helibowl antenna 52. The dipole antenna 50 and the helibowl antenna 52 are used simultaneously to provide complete coverage of the viewable GPS constellation 22. The dipole antenna 50 is vertically positioned to view satellites that are close to the horizon. (Less than 3 degrees up to about 30 degrees). The helibowl antenna 52 is located at the top of the dipole antenna 50. The helibowl antenna 52 views satellites whose angle is 30 degrees or higher, with respect to the horizon. Separating the coverage area in this manner allows the antenna patterns to be focused on a smaller area and thus provides more gain. Another advantage of this configuration is that it allows the master station 18 to reduce the amount of multipath present in the GPS signal, thus providing more accurate pseudo-range data. A diagram illustrating the coverage area of the GPS antenna 32 is shown in FIG. 5.

GPS Receiver 34

The GPS receiver 34 receives the GPS signal from the GPS antenna 32 and calculates pseudo-range data. The GPS receiver 34 can be a Beeline GPS card obtainable from Novatel of Calgary, Canada. The GPS receiver 34 is preferably a high performance real time GPS receiver, capable of receiving the GPS signal from 8 satellites on at least two separate antennas. While the GPS receiver 34 is capable of calculating accurate position, this is not the function of the GPS receiver 34 in the present implementation.

The GPS receiver 34 is used as a pseudo-range collector. As a pseudo-range collector, the GPS receiver 34 reads the GPS signals from the GPS antenna 32 via a signal path 53 and calculates pseudo-ranges to each of the satellites whose signal is being received. These pseudo-ranges are then passed to the master station 18, where they will be used to calculate the pseudo-range corrections that are needed for differential navigation. In order to transfer the data to the master station 18, the GPS receiver 34 transports the data across one of its two built in ports, such as serial ports, to the wireless transceiver 24 as indicated by a signal path 54 depicted in FIG. 3.

The serial ports on the GPS receiver 34 are used for bi-directional communication. The GPS receiver 34 can be configured via these serial ports, in addition to transporting data across them. The GPS receiver 34 is configured to transmit satellite numbers, GPS time and pseudo-range data to the master station 18.

Due to its inherent stability, spread spectrum technology was chosen as the primary means of communication between the wireless transceiver 24 of the reference station 14 to the master station 18. To communicate with the master station 18, each reference station 14 is equipped with a 900 MHz spread spectrum wireless data transceiver. The wireless data transceiver 24 can be obtained from Freewave Technologies of Boulder, Colo.

The GPS receiver 34 and the wireless transceiver 24 are connected with any suitable communication link, such as a 9-pin serial connection and communicate with each other using any suitable protocol, such as RS-232 protocol. The wireless transceiver 24 receives the pseudo-ranges from the GPS receiver 34 and then transmits the pseudo range information including the satellite numbers and GPS time to the master station 18.

Master Station 18

The master station 18 receives data from all of the reference stations 14 and calculates the corresponding pseudo-range corrections. The master station 18 then formats the pseudo-range corrections along with pertinent runway information into a correction message and transmits the correction message to the LAAS receiver 20.

Figure 6:
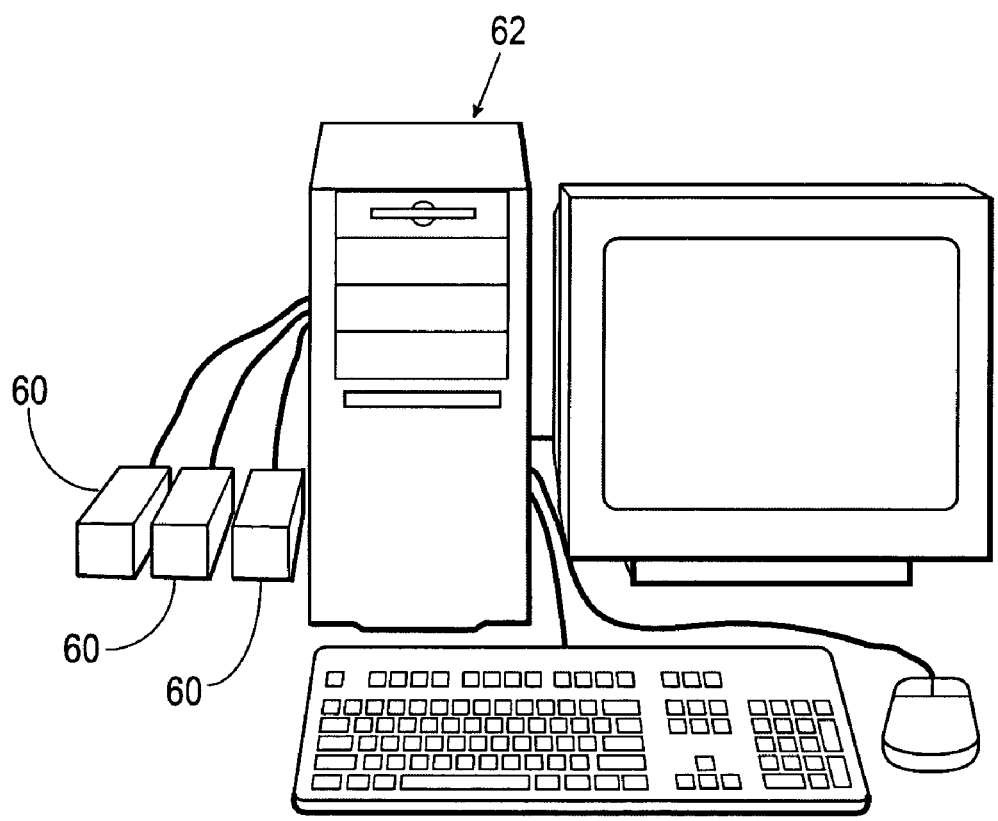
FIG. 6 is a perspective view of a master reference unit constructed in accordance with the present invention.
Figure 7:
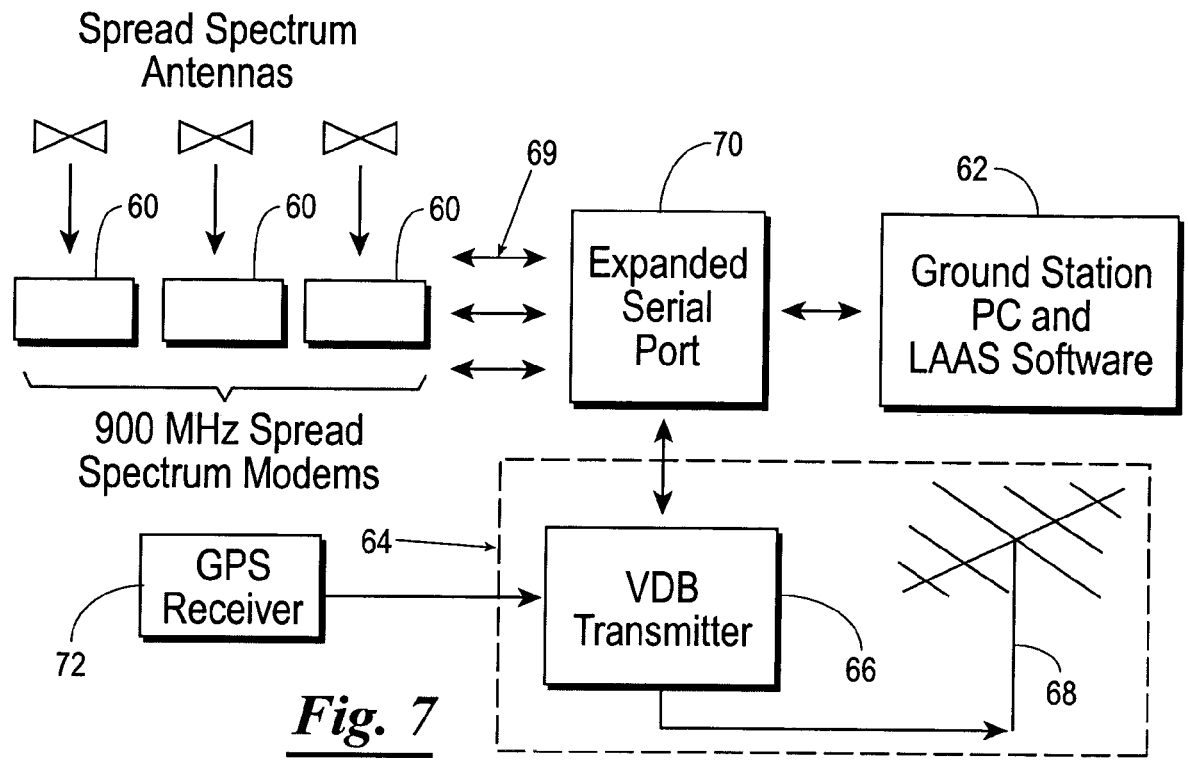
FIG. 7 is a block diagram of the master reference unit depicted in FIG. 6.

As shown in FIGS. 6 and 7, the master station 18 is provided with at least two wireless transceivers 60 (one for each reference station), a computer 62 for analysis, a broadcast unit 64, such as a VHF Data Broadcast (VDB) transmitter 66 and an antenna 68, such as a VHF antenna. The master station 18 desirably includes at least three wireless transceivers 60.

At the master station 18, the wireless transceivers 60 receive the pseudo-range information from the reference stations 14 and pass the pseudo-range information on to the computer 62 of the master station 18 over a suitable communication link, such as a high speed RS-232 connection 69, for analysis.

Each wireless transceiver 60 at the master station 18 is partnered with an identical wireless transceiver 24 at the reference station 14, in order to form a reliable link between the master station 18 and the reference station 14. The three wireless transceivers 60 at the master station 18 are all connected to the Computer 62 through any suitable communication link, such as an expanded serial interface 70, which increases the serial bus to 16 ports that are specifically designed for high speed, high volume data transfer. A picture of the wireless transceivers 60, and computer 62, of the master station 18 is shown in FIG. 6.

The computer 62 that was chosen for the pseudo-range computations is a Dell Opti Plex GX1p personal computer (PC). Standard options on the Opti Plex GX1p-include a 450 MHz Pentium III processor, 256 MB of RAM and a 10 GB hard drive. The computer 62 communicates with all of its peripherals (modems and VDB transmitter) via its augmented serial interface 70. The serial interface 70 has been expanded in order to allow all of the peripherals access to the serial bus. Although the computer 62 has been described herein as a personal computer, it should be understood that the computer 62 can be any type of computing device capable of executing the software and outputting the data necessary to provide the functions discussed herein.

One suitable operating system used by the computer 62 of the master station 18 is QNX. QNX is a UNIX-based operating system designed to provide real-time computation. QNX was selected because the LAAS application is to operate as close to real-time as possible. Real-time operation is necessary because the pseudo-range corrections are time perishable and the process is time interrupt driven.

The LAAS software is an implementation of Differential GPS, which utilizes a voting system with three reference stations 14 to minimize error, thus improving accuracy and integrity. The LAAS software receives data from each reference station 14. This data includes the GOS time, satellite number, and pseudo range. The master station 18 uses the satellite number, along with the surveyed location of each reference station 14, to calculate the true pseudo-range to a given satellite. The LAAS software then compares the true pseudo-range with the calculated pseudo-range from each reference station 14 for a particular satellite. If at least two of the reference stations 14 have calculated pseudo-ranges that are within a given tolerance of the true pseudo-range, the satellite is used for calculating pseudo range corrections. Once minimum error pseudo-ranges have been determined, the master station 18 calculates the error in the pseudo-ranges. The error is the difference between the true pseudo-range and the calculated pseudo-range. This correction is then formatted into the correction message for transmission. Along with the ground-monitored differential corrections, the transmitted correction message contains data including the definition of all final approach paths in the master station's service area. A final approach path is a geometric path-in-space to which the aircraft on approach will navigate. The correction and approach data are transmitted on the VDB transmitter 66 to the LAAS receiver 20. The data and format of the data provided via the VDB transmitter 66 are defined in RTCA, GNSS-Based Precision Approach Local Area Augmentation System (LAAS) Signal-in-Space Interface Control Document (ICD).

Communication Link to Airplane

The master station 18 transmits pseudo-range correction and approach path information to the LAAS receiver 20 through the use of the VDB transmitter 66. The VDB transmitter 66 is obtainable from Harris of Melbourne, Fla. The VDB transmitter 66 receives RTCA formatted messages from the computer 62 of the master station 18 and broadcasts these messages to the local area (approx. 20-mile radius) described In the LAAS Minimum Aviation System Performance Standards (MASPS). In an effort to ensure that each message is completely received, the VDB must partition the broadcast to avoid superimposing the messages and therefore destroying data. To partition the broadcast, the VDB transmitter 66 needs a clock signal to provide a timing mechanism for separation of the RTCA messages. This clock signal is generated from a GPS receiver 72 located at the master station 18 in the form of a 1 pulse per second time mark.

A suitable GPS receiver to provide this time mark is the Ashtech G-12 GPS receiver.

The VDB message is broadcast to the local area preset frequency within the normal aircraft navigation band (e.g., between 108.5 Mhz and 121.0 Mhz). In one preferred embodiment, the master station 18 broadcasts its information at a frequency of 113.55 MHz at a power of 120 Watts.

To provide an omni-directional coverage area with a radius of approximately 25 miles, it was necessary to design and construct a custom VHF omni-directional antenna. To construct an omni-directional antenna, two dipoles were cut to the correct length for the specified frequency. These two dipoles were attached at a distance of one wavelength apart and perpendicular to each other on a mast. This antenna assembly was then erected at the airport near the VDB transmitter 66. Through the use of this antenna the VDB transmits the pseudo-range corrections and the final approach information to all airborne LAAS receivers in the coverage area of the VDB transmitter 66.

LAAS Receiver 20

Figure 8:
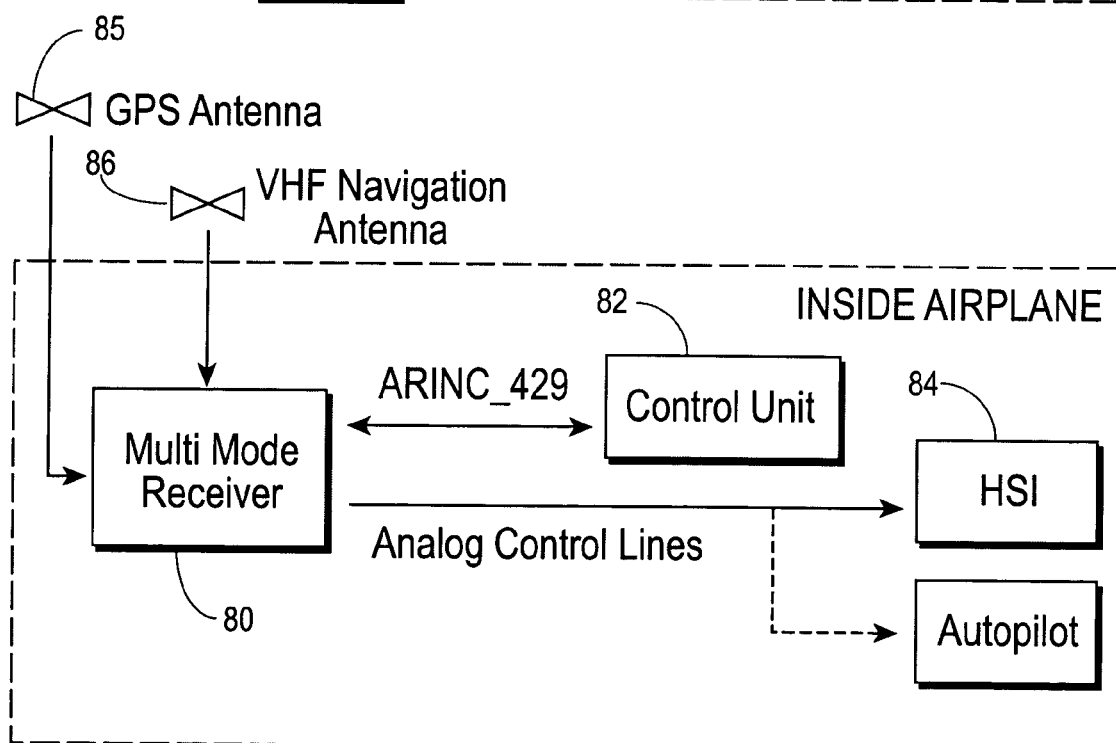
FIG. 8 is a block diagram of a LAAS receiver constructed in accordance with the present invention.

The LAAS receiver 20 receives the standard GPS signal, along with the LAAS information from the master station 18, and combines them to provide precision position information to guide the plane along the approach path. The LAAS receiver 20 is composed of a Multi Mode Receiver (MMR) 80, a Control Unit 82, a Horizontal Situation Indicator (HSI) 84, and two antennas 85 and 86. The antenna 85 receives the GPS signal from the GPS constellation 22. The antenna 86 utilized is a standard VHF navigational antenna, which receives the LAAS signal correction message from the master station 18. The antenna 86 is preferably the aircraft's current VOR antenna, although the antenna 86 could be a separate antenna. The functional layout of the LAAS receiver is illustrated in FIG. 8.

Multi Mode Receiver

The Multi-Mode receiver 80 (MMR), is designed to receive several different navigational signals, such as the GPS, LAAS, ILS, VOR, DME, localizer and many other types. In the LAAS application, the MMR 80 receives the standard GPS signal and the LAAS signal. The LAAS signal is comprised of the differential pseudo-range corrections and data describing the final approach paths that are available to the pilot. The MMR 80 uses the pseudo-range corrections from the LAAS signal to augment the GPS signal and provide a more accurate position calculation. The MMR 80 can be a model GNLU-930 MMR obtainable from Rockwell/Collins.

For the MMR 80 to provide specific final approach guidance, the pilot must select a runway on the control unit 82. With the specific runway selected, the MMR 80 can retrieve the appropriate approach information from the LAAS signal. The MMR 80 compares this runway information with the calculated position of the aircraft and determines how to navigate the plane onto the final approach path. The MMR 80 relays this horizontal and vertical guidance information to the pilot through the airplane's navigational instruments, such as the Horizontal Situation Indicator 84.

Control Unit

Figure 9:
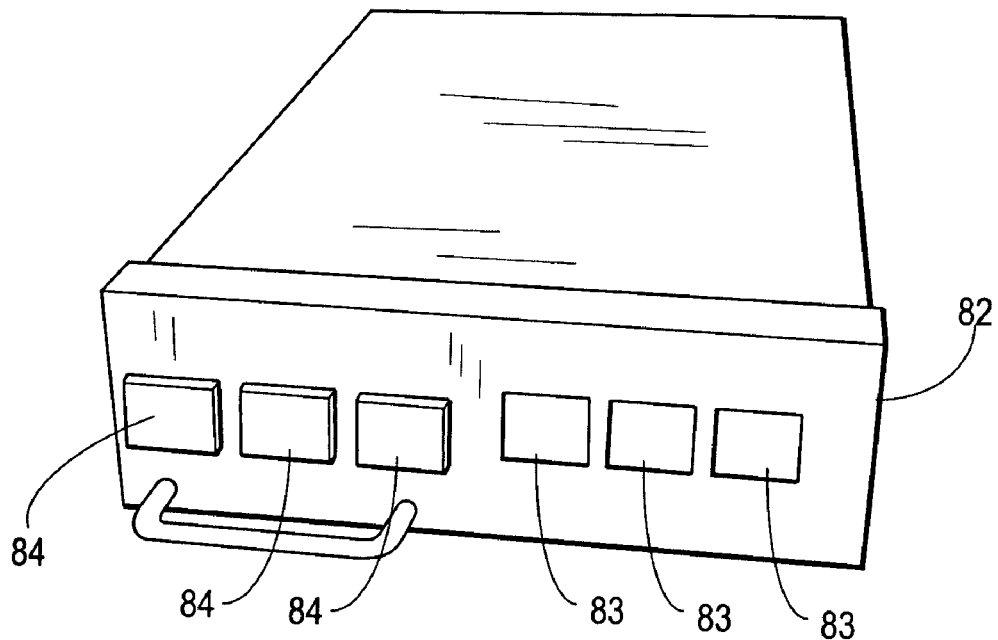
FIG. 9 is a perspective view of a control unit for the LAAS receiver depicted in FIG. 8.
Figure 10:
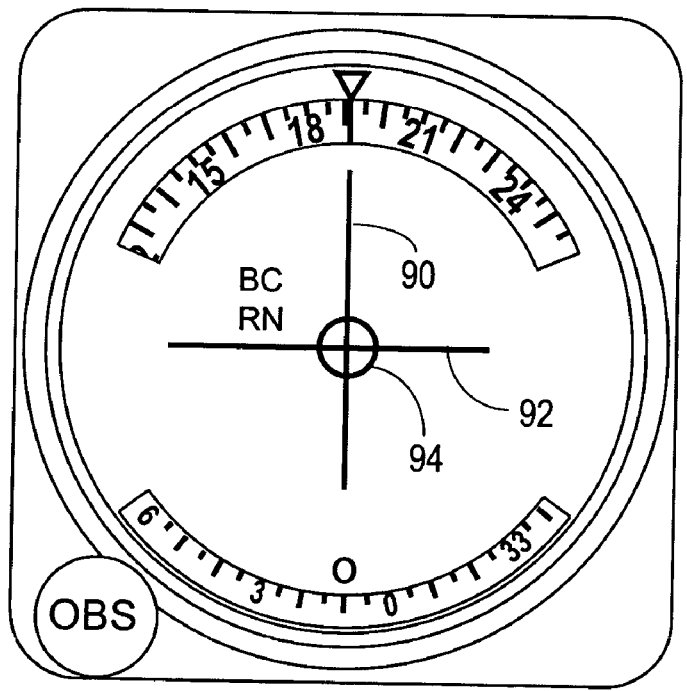
FIG. 10 is an elevational view of a horizontal situation indicator utilized in an airplane.

The control 82 unit functions as an interface between the pilot and the MMR 80, allowing the pilot to select the desired LAAS frequency and runway. The control unit 82 was designed and constructed according to specifications of the FAA. The control unit 82 consists of a Stamp BASIC microprocessor, a set of ARINC 429 drivers at least one Liquid Crystal Display (LCD) 83 and three momentary push buttons 84. The control unit 82 is shown in FIG. 9.

One of the momentary push buttons 84 functions as a mode button and the other two buttons 84 function as up and down buttons. The pilot uses the mode button to select either the frequency mode or the Runway Path Data Selector (RPDS) mode. In the frequency mode the pilot can use the Up and Down buttons to select the frequency on which the L M S information is being broadcast. Additionally, the RPDS mode allows the pilot to select which runway will be used for landing. The stamp microprocessor senses when the buttons are depressed and changes the display 83 accordingly. The microprocessor constructs a digital word representing the chosen LAAS frequency and runway value. The digital word is passed to the ARINC 429 drivers, where the two pieces of information are formatted into, an ARINC 429 word and passed to the MMR 80. The control unit 82 and the MMR 80 communicate across the ARINC 429 data bus in the airplane. The MMR receives these commands and tunes its receiver to the correct LAAS frequency and retrieves the corresponding runway information.

The Multi Mode Receiver (MMR) 80 is capable of using several different navigational aids to calculate aircraft position, such as GPS, localizer, DME and ILS. The MMR has three separate data output buses: ARINC 429, RS-422 and traditional analog outputs. These three buses allow the MMR 80 to interface to almost any piece of conventional avionics, such as EFOS, Flight Management System, Auto Pilot or traditional round dial instruments. The flexibility offered by the MMR 80 allows the LAAS receiver to be implemented in virtually any aircraft.

In the LAAS application the MMR 80 is configured to receive the standard GPS signal and is tuned to receive LAAS information. LAAS testing performed by the inventors uses the MMR's analog outputs to provide horizontal and vertical guidance information to the pilot through the Horizontal Situation Indicator (HSI) 84. The pilot uses the HSI 84 to navigate the plane onto the final approach path.

Horizontal Situation Indicator

The horizontal situation indicator 84 is an analog instrument mounted in the dash of the airplane that consists of a vertical oriented needle 90 and a horizontally oriented needle 92 and a circle 94. The vertically oriented needle 90 is called the Course Deviation Indicator (CDI). The CDI indicates the horizontal position of the aircraft with respect to the final approach path. The horizontally oriented needle 92 is referred to as the Glide Slope Indicator (GSI). The GSI indicates to the pilot the vertical position of the aircraft with respect to the path. The pilot maneuvers the plane according to the CDI and GSI, in an effort to intercept the approach path. The pilot knows that the plane has intercepted the approach path when the two needles intersect at the center of the circle.

REFERENCES

The following references, to the extent that they provide exemplary procedural or other details supplementary to those set forth herein, are specifically incorporated herein by reference in their entirety as though set forth herein in particular.

1. "GNSS Based Precision Approach Local Area Augmentation System (LAAS)-Signal-in-Space Interface Control Document (ICD)", RTCA DO 246A, January 2000.
2. "Minimum Operational Performance Standards for GPS Local Area Augmentation System Airborne Equipment", RTCA DO-253 January 2000.
3. Manual on the Use of the Collision Risk Model Manual (CRM) for ILS Operations. ICAO Document Doc 9724-AN/904.
4. The draft "Manual on Required Navigation Performance (RNP) for Approach Landing and Departure Operations", ICAO All Weather Operations Panel, 16th Meeting, Montreal Canada, June 1996.
5. J. Fagan, "Ground Based Satellite Augmentation System (GBAS) Category A and B Flight Test Results", Proceedings of OCP vol. II, Oct. 9, 2001, pp sw/wp 110–116.
6. Draft GBAS Vol. I Material, OCP-WG/WHL-WP 34, Brussels, Belgium, April 2002.
7. Application of the ILS Equivalency Methodology to Recent GBAS Flight Trails, OCP-WG/WHL-WP 75, Brussels, Belgium, April 2002.

Thus it should be apparent that there has been provided in accordance with the present invention a detailed description, and examples showing the Navigation System 10 functions to provide a reliable and accurate system for navigating airplanes or other objects, such as ships, cars, robots or the like using only GPS signals. Although the invention has been described in conjunction with specific embodiments thereof, it is evident that many alternatives, modifications, and variations will be apparent to those skilled in the art.

Accordingly, it is intended to embrace all such alternatives, modifications, and variations that fall within the spirit and broad scope of the appended claims.

What is claimed is:

1. A local area augmentation navigation system for determining the location of an object using differential GPS, the system comprising:
    at least two reference stations at known locations, each of the reference stations receiving a GPS signal from a GPS constellation and collecting and outputting the pseudo-range data from the GPS signal;
    a master station receiving the pseudo-range data from the reference stations, the master station forming a correction message from the pseudo-range data and the known locations of the reference stations, the master station broadcasting the correction message;
    a security receiver and an evaluation computer cooperating to monitor the broadcast of the correction message by the master station, to also monitor other broadcasts in the area for unauthorized broadcasts having a similar character as the correction message broadcast by the master station, and to output an alert signal upon detection of an unauthorized broadcast, the security receiver receiving the correction message broadcast by the master station via a first communication link, wherein the evaluation computer receives the correction message output by the master station via a second communication link different from the first communication link and determines that an unauthorized broadcaster exists when the message received by the security receiver does not match the correction message broadcast by the master station; and
    a LAAS receiver receiving the correction message broadcast by the master station as well as a GPS signal from the GPS constellation and calculating the location of the LAAS receiver with the correction message and the GPS signal.

2. The local area augmentation navigation system of claim 1, wherein the master station includes a VHF transmitter and broadcasts the correction message with the VHF transmitter.

3. The local area augmentation navigation system of claim 1, wherein the known locations of the reference stations are precisely surveyed locations.

4. The local area augmentation navigation system of claim 1, wherein each of the reference stations includes an independent power supply.

5. The local area augmentation navigation system of claim 4, wherein the independent power supply is a solar power supply.

6. The local area augmentation navigation system of claim 1, wherein the local area augmentation navigation system does not require any external significant power or communication infrastructure.

7. The local area augmentation navigation system of claim 1, wherein the correction message is broadcast as an omni directional data broadcast.

8. The local area augmentation navigation system of claim 1, wherein the correction message is broadcast as a directional data broadcast.

9. The local area augmentation navigation system of claim 1, wherein the object is an airplane, and wherein the correction message includes differential pseudo-range corrections and data describing the final approach paths that are available to the pilot.

10. The local area augmentation system of claim 1, wherein the evaluation computer is implemented in the security receiver.

11. The local area augmentation system of claim 1, wherein the evaluation computer is implemented in the master station.

12. The local area augmentation system of claim 1, wherein the evaluation computer is implemented in an air traffic control computer.

13. The local area augmentation system of claim 1, wherein the reference stations communicate with the master station via wireless transceivers.

14. The local area augmentation system of claim 1, wherein the communication between the reference stations and the master station is encoded.

15. A local area augmentation navigation system for determining the location of an object using differential GPS, the system comprising:
    at least two reference stations at known locations, each of the reference stations receiving a GPS signal from a GPS constellation and collecting and outputting the pseudo-range data from the GPS signal;
    a master station receiving the pseudo-range data from the reference stations, the master station forming a correction message from the pseudo-range data and the known locations of the reference stations, the master station broadcasting the correction message;
    a security receiver and an evaluation computer cooperating to monitoring the broadcast of the correction message by the master station, to also monitor other broadcasts in the area for unauthorized broadcasts having a similar character as the correction message broadcast by the master station, and to output an alert signal upon detection of an unauthorized broadcast, the security receiver having an antenna separate from the master station, the security receiver receiving the correction message broadcast by the master station via a first communication link, and wherein the evaluation computer receives the correction message output by the master station via a second communication link different from the first communication link and determines that an unauthorized broadcaster exists when the message received by the security receiver does not match the correction message broadcast by the master station; and
    a LAAS receiver receiving the correction message broadcast by the master station as well as a GPS signal from the GPS constellation and calculating the location of the LAAS receiver with the correction message and the GPS signal.

16. The local area augmentation navigation system of claim 15, wherein the master station includes a VHF transmitter and broadcasts the correction message with the VHF transmitter.

17. The local area augmentation navigation system of claim 15, wherein the known locations of the reference stations are precisely surveyed locations.

18. The local area augmentation navigation system of claim 15, wherein each of the reference stations includes an independent power supply.

19. The local area augmentation navigation system of claim 18, wherein the independent power supply is a solar power supply.

20. The local area augmentation navigation system of claim 15, wherein the local area augmentation navigation system does not require any external power or communication infrastructure.

21. The local area augmentation navigation system of claim 15, wherein the correction message is broadcast as an omni directional data broadcast.

22. The local area augmentation navigation system of claim 15, wherein the correction message is broadcast as a directional data broadcast.

23. The local area augmentation navigation system of claim 15, wherein the object is an airplane, and wherein the correction message includes differential pseudo-range corrections and data describing the final approach paths that are available to the pilot.

24. The local area augmentation system of claim 15, wherein the evaluation computer is implemented in the security receiver.

25. The local area augmentation system of claim 15, wherein the evaluation computer is implemented in the master station.

26. The local area augmentation system of claim 15, wherein the evaluation computer is implemented in an air traffic control computer.

27. The local area augmentation system of claim 15, wherein the reference stations communicate with the master station via wireless transceivers.

28. The local area augmentation system of claim 15, wherein the communication between the reference stations and the master station is encoded.

29. A local area augmentation navigation system for determining the location of an object using differential GPS, the system comprising:
  at least two reference stations at known locations, each of the reference stations receiving a GPS signal from a GPS constellation and collecting and outputting the pseudo-range data from the GPS signal;
  a master station receiving the pseudo-range data from the reference stations, the master station forming a correction message from the pseudo-range data and the known locations of the reference stations, the master station broadcasting the correction message;
  a security receiver and an evaluation computer cooperating to monitor the broadcast of the correction message by the master station, to also monitor other broadcasts in the area for unauthorized broadcasts having a similar character as the correction message broadcast by the master station, and to output an alert signal upon detection of an unauthorized broadcast, the security receiver positioned remotely from the master station, the security receiver receiving the correction message broadcast by the master station via a first communication link, and wherein the evaluation computer receives the correction message output by the master station via a second communication link different from the first communication link and determines that an unauthorized broadcaster exists when the message received by the security receiver does not match the correction message broadcast by the master station; and
  a LAAS receiver receiving the correction message broadcast by the master station as well as a GPS signal from the GPS constellation and calculating the location of the LAAS receiver with the correction message and the GPS signal.

30. The local area augmentation navigation system of claim 29, wherein the master station includes a VHF transmitter and broadcasts the correction message with the VHF transmitter.

31. The local area augmentation navigation system of claim 29, wherein the known locations of the reference stations are precisely surveyed locations.

32. The local area augmentation navigation system of claim 29, wherein each of the reference stations includes an independent power supply.

33. The local area augmentation navigation system of claim 32, wherein the independent power supply is a solar power supply.

34. The local area augmentation navigation system of claim 29, wherein the local area augmentation navigation system does not require any external power or communication infrastructure.

35. The local area augmentation navigation system of claim 29, wherein the correction message is broadcast as an omni directional data broadcast.

36. The local area augmentation navigation system of claim 29, wherein the correction message is broadcast as a directional data broadcast.

37. The local area augmentation navigation system of claim 29, wherein the object is an airplane, and wherein the correction message includes differential pseudo-range corrections and data describing the final approach paths that are available to the pilot.

38. The local area augmentation system of claim 29, wherein the evaluation computer is implemented in the security receiver.

39. The local area augmentation system of claim 29, wherein the evaluation computer is implemented in the master station.

40. The local area augmentation system of claim 29, wherein the evaluation computer is implemented in an air traffic control computer.

41. The local area augmentation system of claim 29, wherein the reference stations communicate with the master station via wireless transceivers.

42. The local area augmentation system of claim 29, wherein the communication between the reference stations and the master station is encoded.

43. A method for enhancing the security of a broadcast of a correction message between a master station of a local area augmentation system and a LAAS receiver, comprising the step of:
  monitoring the broadcast between the master station of the local area augmentation system and the LAAS receiver for unauthorized broadcasts in the area having a similar character as the correction message broadcast by the master station using a security receiver and an evaluation computer;
  receiving the correction message output by the master station via a first communication link by the security receiver and a second communication link by the evaluation computer; and
  outputting an alert signal when the message received by the security receiver and evaluation computer does not match the correction message broadcast by the master station.

* * * * *

UNITED STATES PATENT AND TRADEMARK OFFICE
CERTIFICATE OF CORRECTION

PATENT NO. : 7,164,383 B2
APPLICATION NO. : 10/669614
DATED : January 16, 2007
INVENTOR(S) : John E. Fagan et al.

Page 1 of 1

It is certified that error appears in the above-identified patent and that said Letters Patent is hereby corrected as shown below:

On the title page item (75), Under the heading "Inventors" : Delete the inventor name "Hengquin" and replace with -- Hengqing--.

In the Specification:
Column 8, line 45: After "independent" delete "to" and replace with -- of --.

In the Claims:
Column 15, line 52: After the word "external" delete "significant".

Signed and Sealed this

Thirty-first Day of July, 2007

JON W. DUDAS
*Director of the United States Patent and Trademark Office*